(12) United States Patent
Yu et al.

(10) Patent No.: US 6,651,172 B1
(45) Date of Patent: Nov. 18, 2003

(54) MULTI-PHASE EEPROM READING FOR NETWORK INTERFACE INITIALIZATION

(75) Inventors: Ching Yu, Santa Clara, CA (US); Jeffrey Dwork, San Jose, CA (US); John Chiang, San Jose, CA (US); Hung-Duy Vo, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/321,842

(22) Filed: May 28, 1999

(51) Int. Cl.[7] .......................... G06F 9/00; G06F 15/173
(52) U.S. Cl. .......................... 713/200; 713/2; 713/100; 714/3; 714/36
(58) Field of Search ................... 713/200, 201, 713/2, 100; 714/3, 36

(56) References Cited

U.S. PATENT DOCUMENTS

| | | | | |
|---|---|---|---|---|
| 4,841,133 A | * | 6/1989 | Gercekci et al. | 235/492 |
| 5,731,972 A | * | 3/1998 | Yamamoto et al. | 364/184 |
| 5,805,882 A | * | 9/1998 | Cooper et al. | 395/652 |
| 6,272,584 B1 | * | 8/2001 | Stancil | 710/241 |

* cited by examiner

Primary Examiner—Norman M. Wright

(57) ABSTRACT

A novel method is provided for initializing a data processing system having registers programmable with configuration data read from a non-volatile memory at power-up. The method includes segmenting the non-volatile memory into a first portion for storing first data, and a second portion for storing second data having lower priority than the first data. The first portion is smaller than the second portion. The first data are read from the first portion to program a first group of registers. Thereafter, the second data are read from the second portion to program a second group of registers. As a result, a host is enabled to access the first group of registers, while the second data are being read from the second memory portion.

16 Claims, 4 Drawing Sheets

MULTI-PHASE EEPROM READING FOR NETWORK INTERFACE INITIALIZATION

FIELD OF THE INVENTION

The present invention relates to data processing, and more specifically, to a network interface having a system for multi-phase reading configuration data from an external EEPROM during an initialization procedure.

BACKGROUND ART

When a user turns on the power of a data processing system, such as a network controller, the hardware automatically resets to begin the process of booting. The reset signal goes to all programmable circuits. In response, these circuits initialize certain essential registers, such as system configuration registers, to place the system into a known state, from which system applications may be executed.

An external non-volatile memory, such as an electrically erasable permanent read-only memory (EEPROM), may store system-dependent configuration information, which. allows a network controller to program many of its features at power-up. The network controller comprises multiple registers programmable at power-up by reading configuration information from the EEPROM. For example, the EEPROM may store such configuration information as the size and boundary of a buffer memory, subsystem and vendor ID information, media-independent interface (MII) address, status and control information, bus interface configuration and control information, system status or activity represented by light-emitter diode (LED) indicators, full-duplex control information, etc.

As a regular EEPROM interface supports a serial data transfer, reading the EEPROM at power-up takes a substantial period of time, during which the host is not able to access the configuration information required to complete booting.

Therefore, it would be desirable to create an EEPROM reading scheme that allows the network controller to. reduce booting time.

DISCLOSURE OF THE INVENTION

The present invention provides a novel method of initializing a data processing system having registers programmable with data read from a non-volatile memory, such as an EEPROM, at power-up. The method includes segmenting the non-volatile memory into a first portion for storing priority data, and a second portion for storing regular data. The first portion is smaller than the second portion. The priority data are read from the first portion to program a first group of registers. Thereafter, the regular data are read from the second portion to program a second group of registers.

In accordance with one aspect of the invention, a host is enabled to access the first group of registers, while the regular data are read from the second memory portion. Data validity verification may be performed on the priority data after reading them from the first memory portion but before reading the regular data from the second memory portion.

The data processing system of the present invention comprises at least one first register programmable with first data read from the non-volatile memory, and at least one second register programmable with second data read from the external memory. The second data has higher length than the first data. A data reading circuit performs a multi-phase reading of the register data from the memory to read the first data before reading the second data so as to program the first register before programming the second register. The first data may have higher priority than the second data In accordance with a preferred embodiment, the non-volatile memory may be segmented into a small section for storing the first data and a larger section for storing the second data. The data reading circuit provides data validity verification on the first data before reading the second data.

In accordance with another aspect of the invention, a data processing system controlled by a host has a first and a second group of registers programmable with data read from a non-volatile memory at power-up. The first group of registers is programmable with first data relating to configuration of a bus interface that provides interface to the host. The data reading circuit reads the first data from the memory before reading second data for programming the second group of registers.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention will be described with the example of a network interface in a packet switched network, such as an Ethernet (IEEE 802.3) network. It will become apparent, however, that the present invention is applicable to any data processing system.

Figure 1A:
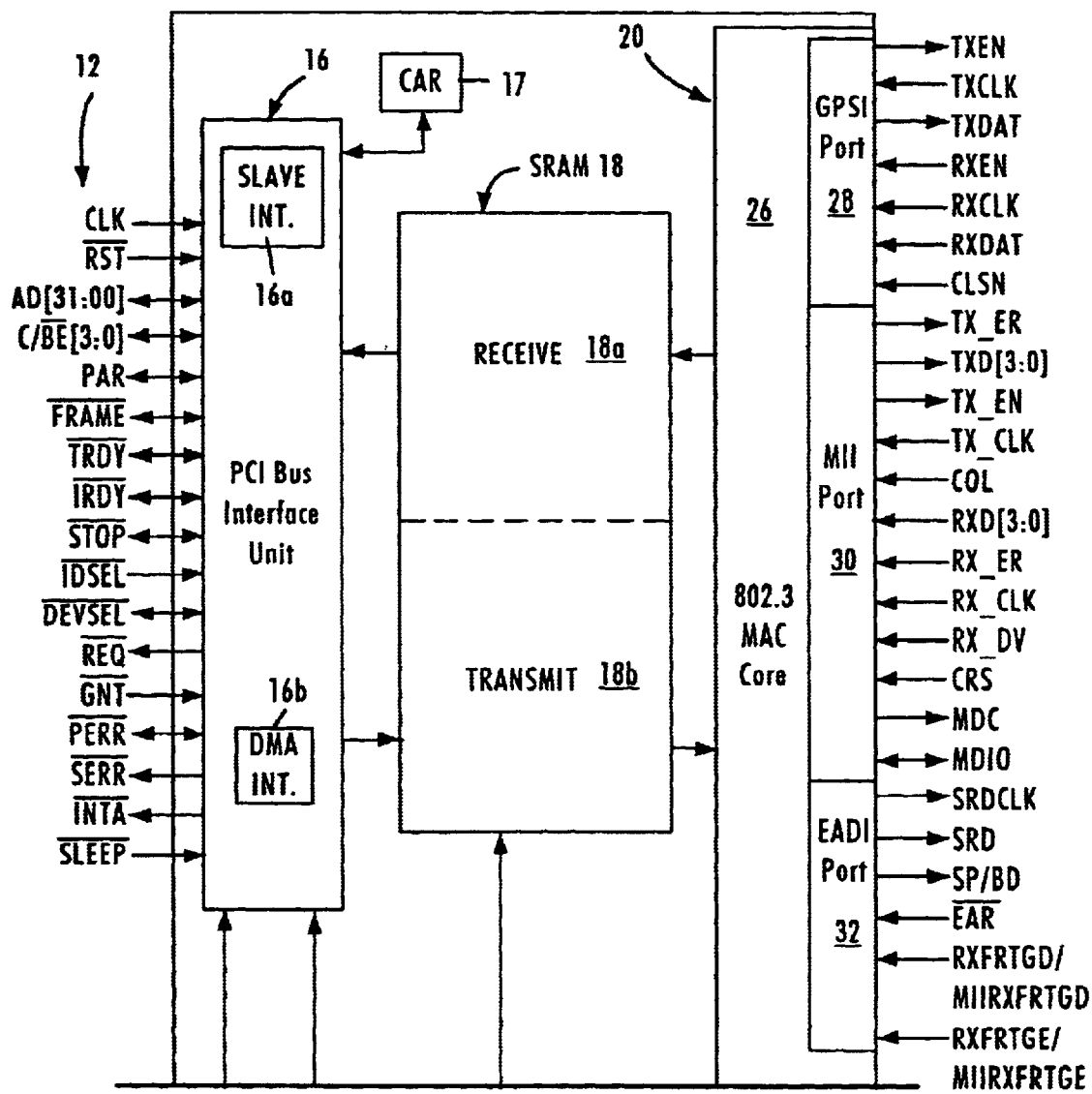
FIG. 1 is a block diagram illustrating an exemplary network interface that may contain the interrupt management circuit of the present invention.
Figure 1B:
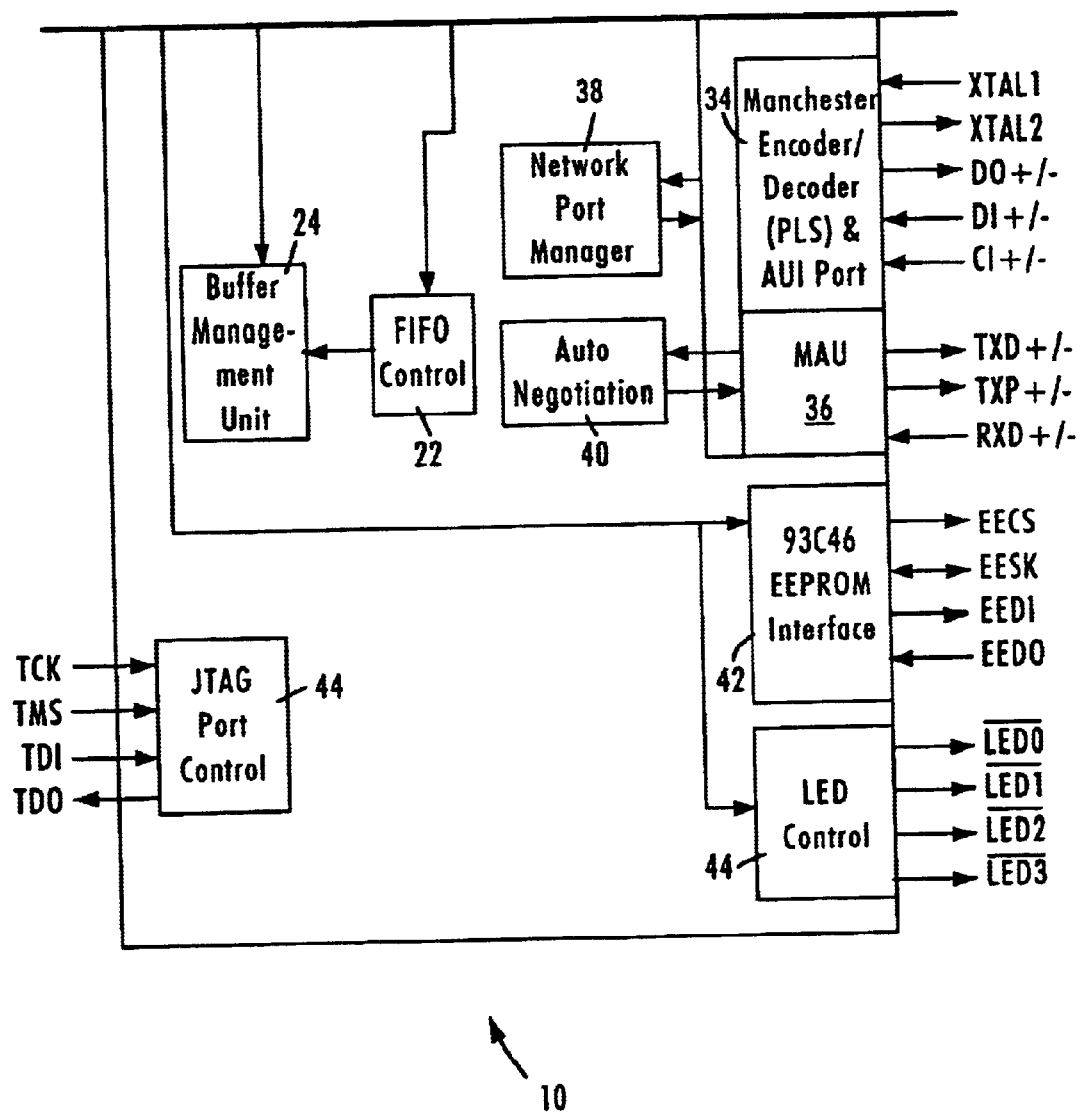

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16. has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A Control and Register (CAR) block 17 contains registers that support interactions between the PCI bus interface 16 and other blocks of the network interface 10. The CAR block 17 has a register interface to the PCI bus interface 16 to allow read and write accesses to the registers. For example, the CAR block comprises a command register that decodes commands from the CPU and sends command signals to other blocks of the network interface 10. The CAR block 17 is responsible for interrupt generation and batching. The CAR block 17 contains counters and timers for controlling interrupts and providing information to the CPU regarding latency and access time. Also, the CAR block 17 generates reset signals supplied to all other blocks of the interface 10, and provides input/output control.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

An auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

An LED controller 42 selectively controls the generation of LED output signals based upon the internal decoding logic and network interface status registers (not shown). The network interface 10 also includes an IEEE 1149.1-compliant JTAG boundary scan test access port interface 44.

An EEPROM interface 46 connects to an EEPROM on either a network interface adapter card or the motherboard of the host computer via a serial interface link. The EEPROM is programmed with system-dependent configuration information enabling the network interface to be configured during initialization. The EEPROM interface 46 has a EEPROM Chip Select pin (EECS), a EEPROM Data In pin (EEDI), a EEPROM Data Out pin (EEDO) and a EEPROM Serial Clock pin (EESK) designed to directly interface the network interface 10 to a serial EEPROM. The EECS is connected to the EEPROM's chip select pin, the EEDI is connected to the EEPROM's data input pin, the EEDO is coupled to the EEPROM's data output pin, and the EESK is connected to the EEPROM's clock pin.

Figure 2:
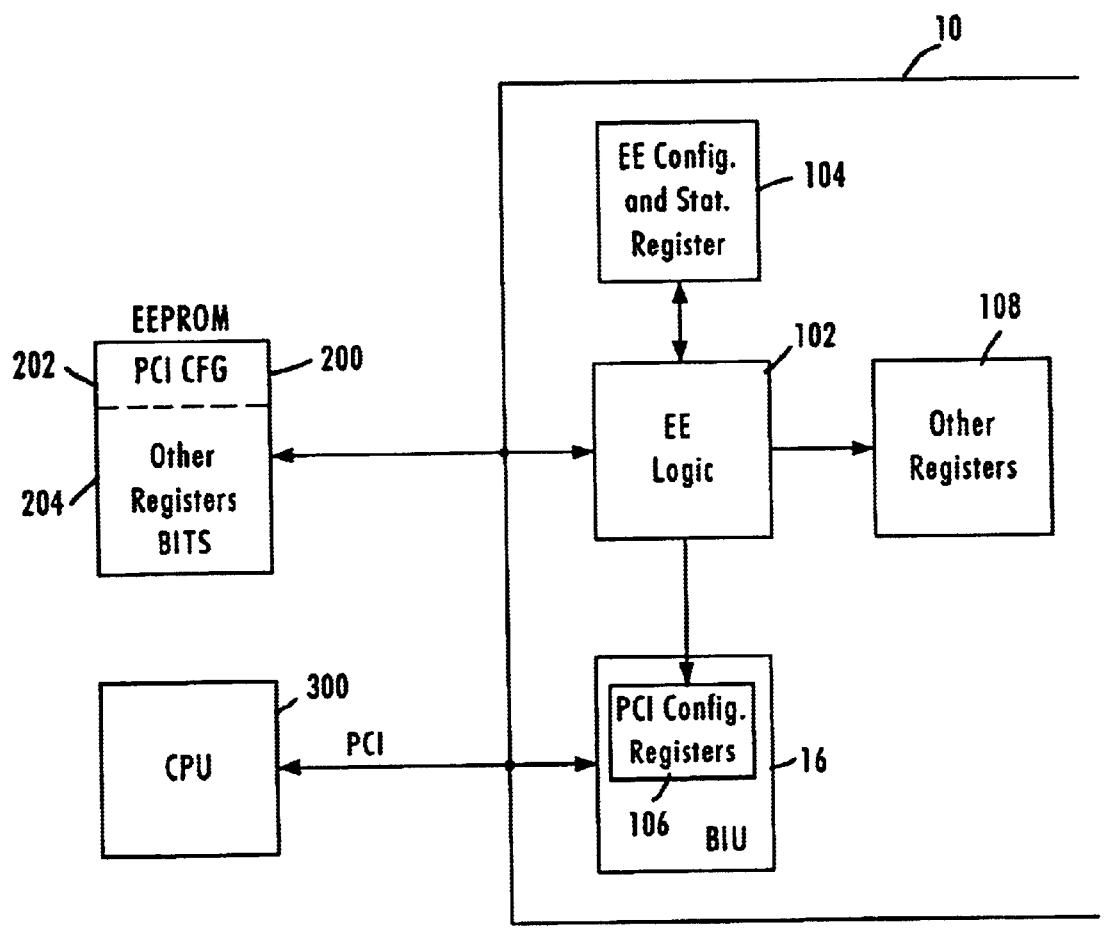
FIG. 2 is a diagram illustrating EEPROM multi-phase reading mechanism in accordance with the present invention.

Referring to FIG. 2, the network interface 10 comprises EEPROM logic 102 for driving the pins of the EEPROM interface 46 to handle data exchange between the network interface 10 and the EEPROM 200. An EEPROM control and status register 104 of the network interface 10 controls the EEPROM logic 102 to perform read and write accesses to the EEPROM 200.

The register 104 may contain a data input/output bit that reflects the value of the EEDO input of the EEPROM interface 46 coupled to the data output of the EEPROM 200. Data written to this bit will appear on the EEDI output of the EEPROM interface 46 connected to the data input of the EEPROM 200. Also, the register 104 may contain a read valid bit that indicates that a read operation to the EEPROM 200 has occurred. The read valid bit set into a predetermined state confirms that an EEPROM connected to the EEPROM interface 46 is detected, and the data read from the EEPROM 200 have passed a data validity verification operation, such as a checksum verification.

Further, the EEPROM control and status register 104 may contain an enabling bit for enabling control of the EEPROM interface 46, a chip select bit used to assert the EECS pin of the EEPROM interface 46, and a serial clock bit used for controlling the EESK pin of the EEPROM interface 46. The register 104 may be directly accessed by the user to write and read data to and from the EEPROM 200.

The EEPROM logic 102 enables the network interface 10 to read configuration data from the EEPROM 200 at power-up. The EEPROM configuration data allows various registers of the network interface 10 to be programmed automatically during an EEPROM initialization procedure. For instance, the EEPROM 200 may contain configuration information for PCI configuration registers 106 arranged in the bus interface unit 16. Also, the configuration data read from the EEPROM 200 may be used to program other registers 108, such as LED programming registers for controlling the LED controller 42, MAC address and control registers, MII control register, etc.

The PCI configuration registers 106 may include a PCI latency timer and cache size register, a PCI expansion ROM base address register, a PCI subsystem ID register, a PCI maximum latency and minimum grant register, and a PCI power management capabilities register. The PCI latency timer and cache size register indicates the minimum guaranteed time the network interface 100 will control the PCI bus 12 after beginning a bus master operation, and the size of a cache memory used in conjunction with system memory read and write commands. The PCI expansion ROM base address register indicates address and size of an expansion ROM in the network interface 10. The PCI subsystem ID register identifies the add-in card or subsystem used in the network interface 10. The PCI maximum latency and minimum grant register indicates the maximum arbitration latency that the network interface can sustain without causing problems with network activity, and the minimum length of a burst period that the network interface 10 needs in order to keep up with network activity. The PCI power management capabilities register identifies power management functions supported by the network interface 10.

A host CPU 300 accesses the PCI configuration registers 16 via the PCI bus interface 16 to obtain information required to control network interface activity. Thus, the host CPU 300 is not able to control the network interface 10 until the PCI configuration registers 106 are programmed with configuration information stored in the EEPROM 200.

For example, the PCI expansion ROM base address register provides the host CPU 300 with information on the size and address of an expansion ROM, which may be used to store booting information. Accordingly, the host CPU 300 is not able to complete a booting procedure until it reads the expansion ROM data from the PCI expansion ROM base address register.

In accordance with the present invention, the EEPROM 200 is segmented into a small PCI configuration section 202 and an other registers section 204 substantially larger than the PCI configuration section. The PCI configuration section 202 contains configuration information for the PCI configuration registers 106.

For example, the EEPROM 200 may contain 64 two-byte words accessible during the EEPROM read operation. The PCI configuration section 202 may contain 10 words including two words of configuration data for the PCI latency timer and cache line size register, two words for the PCI subsystem ID register, two words for the PCI expansion ROM base address register, two words for the PCI maximum latency and minimum grant register, and two words for PCI power management capabilities register. The other registers section 204 may contain the remaining 54 words including 10 words for the LED programming registers, 10 words for MAC registers, two words for MII registers, etc.

Figure 3:
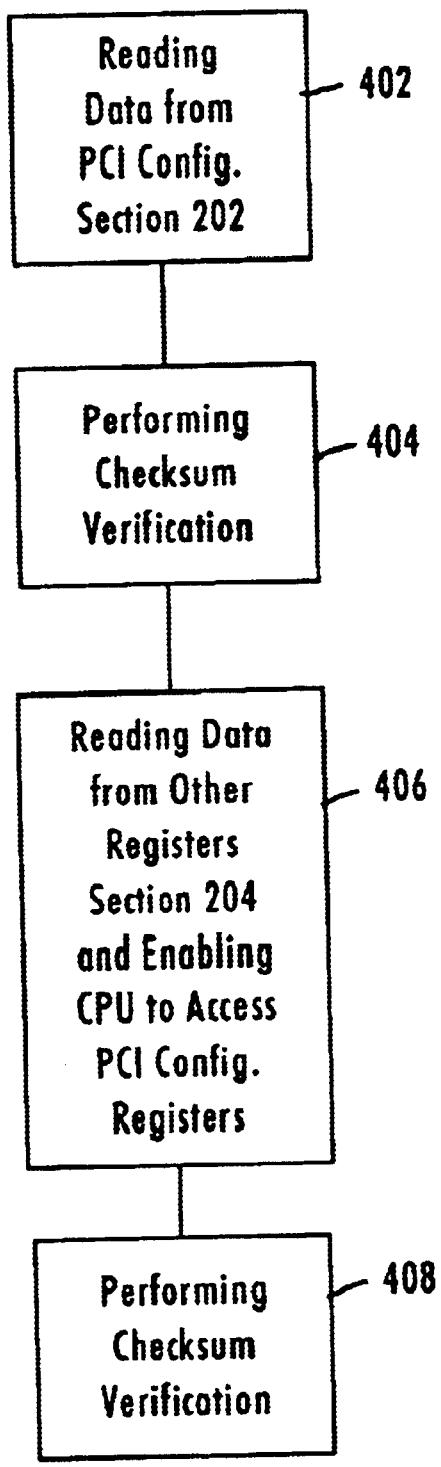
FIG. 3 is a flow-chart illustrating multi-phase EEPROM reading in accord with the present invention.

The EEPROM logic 102 may perform automatic EEPROM read operation during the network interface initialization procedure to read configuration data from the EEPROM 200. For example, the EEPROM read operation procedure may be automatically initialized in response to the deassertion of the reset (RST/) pin in the PCI interface 16 at power-up. As shown in FIG. 3, immediately after the initialization of the EEPROM read operation, the EEPROM logic 102 reads configuration data stored in the PCI configuration section 202 of the EEPROM 200 (block 402). For example, the configuration data from the section 202 may be serially shifted into a temporary register and then sent to the corresponding PCI configuration registers 106 in the PCI bus interface 16 to program these registers with the configuration data from the PCI configuration section 202.

After the configuration data is read from the PCI configuration section 202, the EEPROM logic 102 performs a checksum verification on the configuration data read from the section 202 (block 404).

If the checksum verification passes, the read valid bit in the EEPROM control and status register 104 is set into a predetermined state confirming the validity of the configuration data read from the PCI configuration section 202. As a result, the CPU 300 is enabled to access the PCI configuration registers 106 in order to continue booting (block 406). If the checksum verification fails, the PCI configuration registers 106 will be forced back to their default states.

When the validity of the PCI configuration data is confirmed, the EEPROM logic 102 reads configuration information from the other registers section 204 of the EEPROM 200. This information may also be serially shifted into the temporary register and then sent to the corresponding other registers 108 to program these registers.

Thereafter, the EEPROM logic 102 performs a checksum verification on the information read from the other registers section 204 (block 408). If the checksum verification fails, the other registers 108 will be returned to their default states.

As the PCI configuration section 202 is much smaller than the other registers section 204, the configuration data from the section 202 are read much faster than the configuration data from the entire EEPROM 200. Thus, the CPU 300 is enabled to access the PCI configuration registers 106 after a short period of time required for reading the PCI configuration section 202 rather than after a long period of time required for reading data from the entire EEPROM. As a result, the present invention substantially reduces the time required for the system initialization procedure.

In the foregoing specification, the invention has been described with reference to a specific embodiment thereof It will, however, be evident that various modifications and changes may be made thereto without departing from the broader spirit and scope of the invention. The specification and drawings are, accordingly, to be regarded in an illustrative way, rather than in a restrictive sense.

What is claimed is:

1. A data processing system controlled by a host and having registers programmable with register data read from a non-volatile memory, the data processing system comprising:

at least one first register programmable with first data read from the external memory, the first register being accessible to the host, at least one second register programmable with second data read from the external memory, the second data has higher length than the first data, and a data reading circuit for performing a multi-phase reading of the register data from the memory to read the first data before reading the second data so as to program said at least one first register before programming said at least one second register.

2. The system of claim 1, wherein the first data has higher priority than the second data.

3. The system of claim 1, wherein the host is enabled to access said at least one first register while the data reading circuit reads the second data from the memory.

4. The system of claim 1, wherein said at least one first register and said at least one second register are programmed with the first and the second data during initialization of the system.

5. The system of claim 1, wherein the memory is segmented into a first section for storing the first data and a second section for storing the second data, the first section is smaller than the second section.

6. The system of claim 1, wherein the data reading circuit provides data validity verification on the first data before reading the second data.

7. A data processing system controlled by a host and having a first and a second group of registers programmable with data read from a non-volatile memory at power-up, the system comprising:

a bus interface for providing interface to the host, the first group of registers being programmable with first data relating to configuration of the bus interface, and a data reading circuit for reading the first data from the memory before reading second data for programming the second group of registers.

8. The system of claim 7, wherein the data reading circuit performs validity verification on the first data before reading the second data.

9. The system of claim 7, wherein the non-volatile memory has a first section for storing the first data, and a second section for storing the second data, the first section is smaller than the second section.

10. The system of claim 7, wherein the host is enabled to access the first group of registers while the data reading circuit reads the second data from the memory.

11. The system of claim 7, wherein the bus interface provides access of the host to a network interface device.

12. The system of claim 11, wherein the network interface device comprises the first and the second group of registers.

13. The system of claim 12, wherein the non-volatile memory comprises an EEPROM external with respect to the network interface device.

14. A method of initializing a data processing system, comprising the steps of:

segmenting a non-volatile memory for storing information required to program registers of the data processing system into a first portion for storing priority data, and a second portion for storing regular data, the first portion being smaller than the second portion, reading the priority data from the first portion to program a first group of registers, and thereafter, reading the regular data from the second portion to program a second group of registers.

15. The method of claim 14, wherein a host is enabled to access the first group of registers during the step of reading the regular data from the second portion.

16. The method of claim 14, further comprising the step of performing data validity verification on the priority data after reading the priority data from the first portion but before reading the regular data from the second portion.

* * * * *